UNITED STATES PATENT OFFICE.

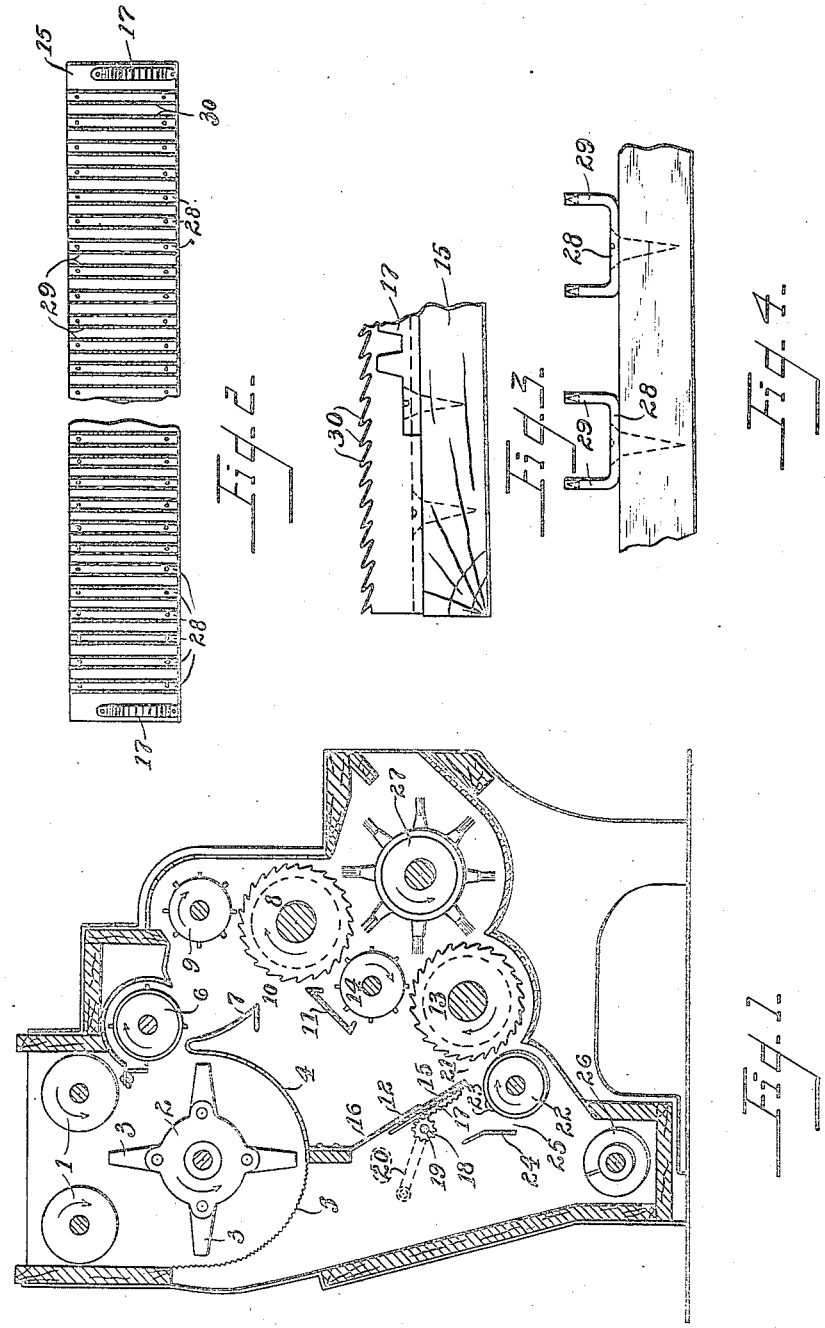

JOHN E. MITCHELL, OF ST. LOUIS, MISSOURI.

COTTON SEPARATING AND CLEANING MACHINE.

1,381,213.  Specification of Letters Patent.  Patented June 14, 1921.

Application filed November 11, 1920. Serial No. 423,298.

*To all whom it may concern:*

Be it known that I, JOHN E. MITCHELL, a citizen of the United States, residing in the city of St. Louis and State of Missouri, have invented new and useful Improvements in Cotton Separating and Cleaning Machines, of which the following is a specification.

This invention relates to cotton separating and cleaning machines of the type forming the subject matter of my prior application for patent, Serial No. 406,117, filed August 26, 1920.

The object of the invention is to provide additional means to those described in said application for preventing the loss of small wads or locks of cotton which have passed by the main cotton separators and a certain portion of which, in the machine described, will be thrown out and passed to the refuse conveyer. The invention consists, therefore, in the provision of cotton catching members, such as saw teeth, arranged in the path of movement of the products thrown upward by the hull roller of the machine referred to and which operate to catch the wads or locks of cotton which may be thrown up by said hull roller, or which may be carried up by the hulls thrown up by said hull roller, and which are in turn knocked off of said saw teeth, or fall off by gravity, and may be carried by said hull roller into contact with the lower saw cylinder and thereby saved.

In the machine referred to an upper and a lower separating or extracting mechanism are combined in one frame, each of said mechanisms comprising a saw cylinder, a kicker roll and a hull roller. Adjacent to the lower saw cylinder and below the opening afforded between the lower end of its hull board and its own surface, there is arranged a hull roller provided with a bumper and adjacent this hull roller is a third hull board. A space is provided between the two hull boards last named through which hulls are thrown by the bumper on the hull roller. These hulls are thrown up against the under side of the hull board coöperating with the lower saw cylinder and are deflected beyond the hull board of the hull roller and fall down into the refuse conveyer. It frequently happens that small locks or wads of cotton are also thrown up by said bumper, or are carried up by the hulls, and fall into the conveyer as refuse. In order to prevent the loss of this cotton, my invention consists, in its preferred embodiment, in locating the cotton catching projections or saw teeth on the underside of the hull board of the lower saw cylinder, whereby the cotton thrown up by the bumper on the hull roller will engage these projections and be held thereby, some of which cotton will at once fall by gravity upon the hull roller to be carried by the latter into engagement with the lower saw cylinder, while others of the wads or locks of cotton will be knocked off of the saw teeth or projections by the hull particles thrown up by the bumper and likewise fall upon the hull roller.

In the accompanying drawing,—

Figure 1 is a view in cross-section of the machine shown in my prior invention referred to and having the hull board of the lower saw cylinder provided on its underside with projections in the form of saw teeth.

Fig. 2 is a bottom plan view, on an enlarged scale, of the portion of the lower hull board provided with the projections or saw teeth;

Fig. 3 is a fragmental end view on a still larger scale, of the hull board shown in Fig. 2; and Fig. 4 is a fragmental edge view of said hull board on the same scale as Fig. 3.

The main parts of the machine illustrated being fully described in my application referred to, and forming no part of the present invention need only be referred to briefly in order that the operation of the machine may be understood. Referring now to Fig. 1, the numerals 1 indicate feed rollers and the numeral 2, a breaking cylinder having the impact fingers 3 and revolving in a casing 4, one side of which is in the form of a screen 5. The numeral 6 indicates a picker roll for removing the cotton and hulls from the cylinder 2, and numeral 7, a hull board for conducting the product to the upper saw cylinder 8. Above this saw cylinder is a kicker roll 9. Between the hull board 7 and saw cylinder 8 is a space 10, through which hulls and cotton not carried out by the saw cylinder 8 pass, and are deflected by a cant board 11 onto the lower hull board 12 which coöperates with the lower saw cylinder 13, above which is a kicker roll 14. The lower hull board 12 is in two parts, the lower portion 15 being slidably mounted with respect to an upper stationary portion 16 and being provided at its end with racks 17 on its under-side which are engaged by pinions 18 on a shaft 19 which may be turned by a crank or lever 20. The purpose of this construction is to adjust the lower edge of the hull board with reference to the saw cylinder 13 to vary the size of the opening 21 between such hull board and saw cylinder. Below the opening 21 is located a hull roller 22 provided with a bumper 23, said hull roller and bumper rotating in proximity at one side to a hull board 24. An opening 25 between said hull roller and hull board is provided for the escape of fine hull particles. Numeral 26 indicates the refuse conveyer and the numeral 27, the doffer for removing cotton simultaneously from the two saw cylinders 8 and 13.

In the operation of the machine, a large part of the cotton delivered from the breaking chamber will be caught up and separated by the action of the saw cylinder and kicker roll 9. The hulls and some of the cotton will pass through the opening 10 and fall upon the lower hull board 12 whence it is directed against the lower saw cylinder 13. This latter will carry up the major portion of the cotton fed to it but small particles of cotton adhering to pieces of hull, or small and rather compact wads or locks of cotton may not be engaged by said saw cylinder and will fall through the opening 21 on to the hull roller 22. The small pieces of hull will escape through the space between the hull roller and the saw cylinder and other pieces will be knocked upward by the bumper 23 against the under-side of the hull board 12 and beyond the top of the hull board 24 and thus fall down into the refuse conveyer. A portion of the cotton passing through the opening 21 will be carried by the hull roller 22 and bumper 23 into engagement with the teeth of the saw cylinder 13 and will be engaged thereby and carried under the kicker roll 14 to be removed by the doffer 27. This may occur at once, that is, as soon as the cotton falls on said hull roller, or it may only occur after the cotton particles have been repeatedly brought into engagement with the saw cylinder by the hull roller. Certain wads or locks not at once caught up by the saw cylinder will, as stated, be thrown upward by the bumper 23 in the revolution of the hull roller 22 against the under-side of the hull board 12, or at least the movable part 15 thereof. In order to prevent these pieces of cotton from being thrown out of the machine I, therefore, provide projections on the under-side of said hull board, which engage the cotton and ultimately permit it to fall back upon the hull roller. To this end I preferably secure on the under-side of the lower section 15 of the hull roller, a series of sheet steel U-bars 28 forming parallel upstanding strips 29, the outer edges of which are provided with saw teeth 30 having their points directed downwardly relative to the position of the hull board in the machine. I find this way of providing the cotton catching projections on the hull board to be a very simple and economical one; but obviously other means of arranging the saw teeth on the under-side of the hull board could be adopted or projections other than saw teeth could be used. The construction illustrated, however, is the one I prefer.

As heretofore stated, the cotton thrown up by the bumper 23 or the cotton adhering to hulls so thrown up, will catch on the pointed projections or saw teeth 30 and will fall, or be knocked off of said projections and again be engaged by the hull roller 22 to be brought again into contact with the saw cylinder 13.

In operation I find that this construction enables me to recover practically all of the cotton escaping the action of the main separators, and which would otherwise pass out of the machine as waste.

I claim:—

1. In a machine of the class described, in combination with cotton separating mechanism, a rotary member upon which cotton and hulls passing by the separating mechanism fall, said rotary member having an impact device and operating to move the cotton falling upon it into proximity to a member of said separating mechanism and to throw out hull particles, and a serrated member in the path of the particles thrown out by said rotary member for engaging any cotton thrown out along with the hulls and permitting its return to said rotary member.

2. In a machine of the class described, in combination with a saw cylinder, a hull board coöperating therewith and defining the size of an opening past the saw cylinder, a rotary member located below said opening and operating to convey cotton passing through said opening to said saw cylinder and to throw hulls and cotton particles against the under-side of said hull board, and means on the under-side of said hull board for engaging the cotton so thrown up and permitting its return to said rotary member.

3. In a machine of the class described, in combination with a rotary saw cylinder, a hull board coöperating therewith and defining the size of an opening past the saw cylinder, a rotary hull roller located beneath said opening and having a bumper, said hull roller having the joint action of conveying the product falling through said opening into proximity to said saw cylinder so that any cotton therein may be caught up by the saw cylinder, and of throwing out hull particles, and a series of sharpened projections arranged on the under-side of said hull board in the path of the hulls thrown out by said hull roller for engaging wads or locks of cotton, or cotton adhering to the hulls, thrown out by said hull roller and permitting the return of the same to the hull roller.

In testimony whereof, I have hereunto set my hand.

JOHN E. MITCHELL.